(12) United States Patent
Lam et al.

(10) Patent No.: US 11,662,046 B2
(45) Date of Patent: May 30, 2023

(54) CONNECTION MEMBER, CONNECTION ASSEMBLY AND TIRE REPAIR MACHINE

(71) Applicant: ACTIVE TOOLS INTERNATIONAL (HK) LTD., Causeway Bay (HK)

(72) Inventors: Koon Fung Lam, Causeway Bay (HK); Jianghua Yan, Causeway Bay (HK)

(73) Assignee: ACTIVE TOOLS INTERNATIONAL (HK) LTD., Causeway Bay (HK)

( * ) Notice: Subject to any disclaimer, the term of this patent is extended or adjusted under 35 U.S.C. 154(b) by 383 days.

(21) Appl. No.: 16/767,696

(22) PCT Filed: Nov. 29, 2017

(86) PCT No.: PCT/CN2017/113495
§ 371 (c)(1),
(2) Date: May 28, 2020

(87) PCT Pub. No.: WO2019/104512
PCT Pub. Date: Jun. 6, 2019

(65) Prior Publication Data
US 2020/0355309 A1    Nov. 12, 2020

(51) Int. Cl.
*F16L 37/252*  (2006.01)
*B29C 73/16*  (2006.01)
*B29L 30/00*  (2006.01)

(52) U.S. Cl.
CPC .......... *F16L 37/252* (2013.01); *B29C 73/166* (2013.01); *B29L 2030/00* (2013.01)

(58) Field of Classification Search
CPC ..... F16L 37/107; F16L 37/113; F16L 37/248; F16L 37/252; B29C 73/166; B29L 2030/00
See application file for complete search history.

(56) References Cited

U.S. PATENT DOCUMENTS

| 259,501 A | * | 6/1882 | Converse ............ F16L 9/08 |
| | | | 285/361 |
| 337,867 A | | 3/1886 | Richards |

(Continued)

FOREIGN PATENT DOCUMENTS

| CN | 101171449 A | 4/2008 |
| CN | 203752543 U | 8/2014 |

(Continued)

OTHER PUBLICATIONS

Japanese Patent Application No. 2020-529380, Notice of Reasons for Refusal, dated Jul. 27, 2021.

(Continued)

*Primary Examiner* — Timothy P. Kelly
(74) *Attorney, Agent, or Firm* — Marshall, Gerstein & Borun LLP

(57) ABSTRACT

The present invention relates to a connector, a connecting assembly and a tire repairing machine. The connector comprises: a circumferential side wall defining an interior cavity of the connector; a first end wall in which a first through hole is provided, the first through hole communicating the interior cavity with an exterior of the connector; a second end wall in which a second through hole is provided, the second through hole communicating the interior cavity with the exterior of the connector, wherein, the first through hole and the second through hole are both of a non-circular shape.

10 Claims, 4 Drawing Sheets

(56) References Cited

U.S. PATENT DOCUMENTS

| | | | |
|---|---|---|---|
| 1,596,645 A | 8/1926 | Whatley | |
| 7,694,698 B2 * | 4/2010 | Marini | B29C 73/166 |
| | | | 222/394 |
| 7,832,775 B2 * | 11/2010 | Regener | F02M 35/10144 |
| | | | 285/402 |

FOREIGN PATENT DOCUMENTS

| | | |
|---|---|---|
| CN | 106809187 A | 6/2017 |
| CN | 207539128 U | 6/2018 |
| DE | 202006004407 U1 | 7/2007 |
| EP | 1726863 A1 | 11/2006 |
| EP | 3202601 A1 | 8/2017 |
| FR | 861123 A | 2/1941 |
| GB | 785310 A | 10/1957 |
| JP | H0230599 U | 2/1990 |
| JP | 2006-117193 A | 5/2006 |
| WO | WO-00/09932 A1 | 2/2000 |
| WO | WO-2007/042116 A1 | 4/2007 |

OTHER PUBLICATIONS

International Application No. PCT/CN2017/113495, International Search Report, dated Aug. 24, 2018.
European Patent Application No. 17933760.5, Extended European Search Report, dated Jun. 22, 2021.

* cited by examiner

CONNECTION MEMBER, CONNECTION ASSEMBLY AND TIRE REPAIR MACHINE

TECHNICAL FIELD

The invention relates to the technical field of mechanical connection; specifically, the present invention relates to connector and further relates to connecting assembly and tire repairing machine.

BACKGROUND ART

A common sealing connection of parts, such as a bolted connection, a flanged connection, etc., requires a longer transition to ensure a fit, resulting in the structure of the sealing connection itself occupying a longer longitudinal space, going against for the compactness of the structure; in addition, a large operation space is needed during disassembly, and disassembly in a small space cannot be realized.

In other sealing connection of parts, the detachable sealing connection of parts tends to require larger assembly size, being more complex in structure and prone to falling out.

SUMMARY

It is an object of an aspect of the present invention to provide an improved connector.

It is an object of another aspect of the present invention to provide an improved connecting assembly.

It is an object of a further aspect of the present invention to provide an improved tire repairing machine.

In order to achieve the foregoing object, a first aspect of the present invention provides a connector, wherein the connector comprises: a circumferential side wall defining an interior cavity of the connector; a first end wall in which a first through hole is provided, the first through hole communicating the interior cavity with an exterior of the connector; a second end wall in which a second through hole is provided, the second through hole communicating the interior cavity with the exterior of the connector, wherein, the first through hole and the second through hole are both of a non-circular shape.

Optionally, in the connector as described above, the first through hole comprises a first round hole and a first guide slot on a periphery of the first round hole, and/or the second through hole comprises a second round hole and a second guide slot on the periphery of the first round hole.

Optionally, in the connector as described above, a first protrusion is provided at a distance from the first guide slot circumferentially on one side within the interior cavity of the first end wall, and/or a second protrusion is provided at a distance from the second guide slot circumferentially on one side within the interior cavity of the second end wall.

Optionally, in the connector as described above, the number of first guide slots is greater than one and the first guide slots are evenly distributed along the circumference of the first round hole, and/or the number of second guide slots is greater than one and the second guide slots are evenly distributed along the circumference of the second round hole.

Optionally, in the connector as described above, the first end wall has a first circumferential limit notch formed at the circumference of the first round hole, and/or the second end wall has a second circumferential limit notch formed at the circumference of the second round hole.

Optionally, in the connector as described above, a damping portion is formed on an outer periphery of the connector.

In order to achieve the foregoing object, a second aspect of the present invention provides a connecting assembly, wherein the connecting assembly comprises: the connector as described in the foregoing first aspect and a first connecting joint on a first component to be connected that conforms to a shape of the first through hole and a second connecting joint on the second component to be connected that conforms to the shape of the second through hole, the first connecting joint is adapted to enter the interior cavity through the first through hole, the second connecting joint is adapted to enter the interior cavity through the second through hole, and after the connector is rotated by a certain angle, within the interior cavity, the first connecting joint is engaged with the first end wall and the second connecting joint is engaged with the second end wall.

Optionally, in the connecting assembly as described above, in the engaged state, a first open end of the first connecting joint sealingly reaches into a second open end of the second connecting joint.

Optionally, in the connecting assembly as described above, the first connecting joint includes a first cylindrical portion having the first open end and a first lug provided on the first cylindrical portion, and/or the second connecting joint has a second cylindrical portion including the second open end and a second lug provided on the second cylindrical portion.

Optionally, in the connecting assembly as described above, a first circumferential limiting protrusion is formed on the outer periphery of the first cylindrical portion and/or a second circumferential limiting protrusion is formed on the outer periphery of the second cylindrical portion.

In order to achieve the foregoing object, a third aspect of the present invention provides a tire repairing machine, wherein the tire repairing machine is provided with the connecting assembly as described in the foregoing second aspect.

Optionally, in the tire repairing machine as described above, the tire repairing machine has a valve body, a tire repairing liquid connecting tube, and an air compressor connecting tube, the tire repairing liquid connecting tube and the air compressor connecting tube are connected to a dispensing nozzle of the tire repairing machine through the valve body, respectively, and a plug capable of sliding back and forth is provided in the valve body; the tire repairing liquid connecting tube and the valve body are connected by the connecting assembly therebetween, and the tire repairing liquid connecting tube and the valve body serve as the first component to be connected and the second component to be connected, respectively.

BRIEF DESCRIPTION OF DRAWINGS

The disclosure of the present invention will be more apparent with reference to the drawings. It should be appreciated that these drawings are for illustrative purposes only and are not intended to pose limitation on the scope of protection of the invention. In the drawings.

DETAILED DESCRIPTION

Figure 1:
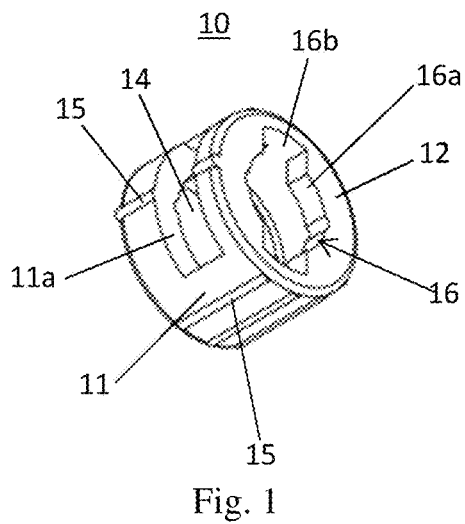
FIG. 1 is a schematic perspective view of a connector according to one embodiment of the present invention.

Specific embodiments of the present invention are illustrated in detail below with reference to the accompanying drawings. Like reference numerals in the various drawings represent like or corresponding technical features.

Figure 2:
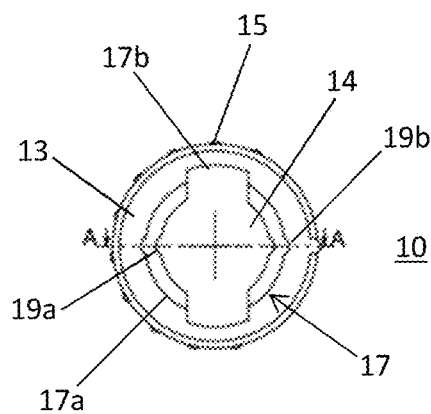
FIGS. 2 and 3 are, respectively, schematic end views of the two ends of the connector in FIG. 1.
Figure 3:
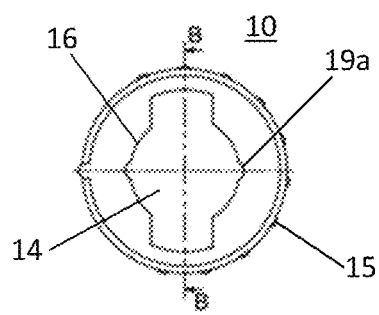
Figure 4:
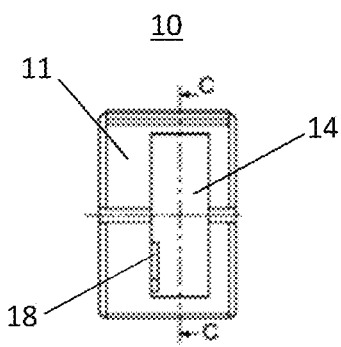
FIG. 4 is a schematic side view of the connector in FIG. 1.

FIG. 1 is a schematic perspective view of a connector according to one embodiment of the present invention. FIGS. 2 and 3 are, respectively, schematic end views of the two ends of the connector in FIG. 1. FIG. 4 is a schematic side view of the connector in FIG. 1.

As can be seen from the figures, the connector 10 may have a circumferential side wall 11, a first end wall 12 and a second end wall 13. In the embodiment shown in the figures, the first end wall 12 and the second end wall 13 may be provided at two end positions of the circumferential side wall 11, respectively. The first end wall 12 and the second end wall 13 are respectively connected or fixed to the circumferential side wall 11, e.g., assembled therewith, or integrally formed. It will be appreciated that the connector 10 may be made of a suitable material, such as plastic or metal, with appropriate thickness and stiffness depending on particular circumstances to meet the requirements of the connecting force.

Circumferential holes (or hollow portions) 11a on the circumferential side wall 11 in the figure are process holes added for molding requirements or ease of processing, and may also be used for cutting by tools through reaching into the interior cavities, etc., simplifying the processing steps, which can advantageously reduce processing costs. Appropriate process hole shapes may be employed depending on the specific processing needs, which itself does not affect the use of the connector 10. It will be appreciated that the process holes may also be eliminated if allowed with the process level.

As can be seen from the figures, the circumferential side wall 11 defines an interior cavity 14 of the connector 10. It will be understood that, in alternative embodiments, the inner and outer peripheral surfaces of the circumferential side wall 11 may be defined as circular cylindrical surfaces for ease of processing and operation, etc. In other alternative embodiments, the inner and outer peripheral surfaces of the circumferential side wall 11 may also be designed as cylindrical surfaces of other shapes according to specific needs of, such as space; or it is not limited to cylindrical designs, and may also be designed as tapered surfaces, or irregular surfaces, or the like.

In the illustrated embodiment, an axially extending, circumferentially distributed raised strips 15 along the connector 10 is distributed on the outer peripheral surface of the connector, being suitable for providing some damping when screwing the connector 10 by manual operation or tool operation, increasing resistance and avoiding slippage during operation, making the operation more reliable and enhancing the user experience. As for specific connecting and operating manner of the connector 10, it will be described in detail below in connection with FIGS. 8-10.

In optional embodiments, alternatively, other types of damping portions may be formed on the outer peripheral surface of the connector, these other types of damping portions are used to replace the raised strips 15. For example, these raised strips may be designed to be curvilinear, or even modified to a notch, groove, concave or convex pattern, or the like. As another example, these other types of damping portions may be discrete point-like protrusions or recesses distributed on the outer peripheral surface of the connector. In additional embodiments, this can also be achieved by increasing the surface roughness of the outer peripheral surface of the connector.

As shown in the figures, the connector 10 may have a first end wall 12. A first through hole 16 may be provided in the first end wall 12, the first through hole 16 communicates the interior cavity 14 with the exterior of the connector 10. According to the illustrated embodiment, the first through hole 16 may include a first round hole 16a and a first guide slot 16b on the periphery of the first round hole 16a.

In optional embodiments, the number of first guide slot 16b may be provided as being greater than one and be evenly distributed along the circumference of the first round hole 16a. Two first guide slots 16b are shown in the illustrated example, and the two first guide slots 16b are distributed diametrically opposite along the first round hole 16a. It is understood that in other embodiments, if there are three, four, etc. first guide slots 16a, they may be evenly distributed every 120 degrees, 90 degrees, etc. circumferentially. A non-uniform distribution is also allowed.

In the illustrated embodiment, the first end wall 12 may also have a first circumferential limit notch 19a formed at the circumference of the first round hole 16a. It will be appreciated that, depending on the specific embodiment, the first circumferential limit notch 19a may not be provided, or a greater number of the first circumferential limit notches 19a may also be provided. The effects thereof are set forth below in conjunction with FIGS. 8-10.

As shown in FIG. 2, the connector 10 may also have a second end wall 13. A second through hole 17 may be provided in the second end wall 13, the second through hole 17 communicates the interior cavity 14 with the exterior of the connector 10. According to the illustrated embodiment, the second through hole 17 includes a second round hole 17a and a second guide slot 17b on the periphery of the first round hole 17a.

In optional embodiments, the number of second guide slot 17b may be provided as being greater than one and be evenly distributed along the circumference of the second round hole 17a. Two second guide slots 17b are shown in the illustrated example, and two second guide slots 17b are distributed diametrically opposite along the second round hole 17b. It is understood that in other embodiments, if there are three, four, etc. second guide slots 17b, they may be distributed every 120 degrees, 90 degrees, etc. circumferentially. A non-uniform distribution is also allowed.

It will be appreciated that the shape, size, angular position of distribution, etc. of the second through hole 17 on the second end wall 13 is not necessarily the same as the shape, size, angular position of distribution, etc. of the first through hole 16 on the first end wall 12.

In the illustrated embodiment, the second end wall 13 may also have a second circumferential limit notch 19b formed at the circumference of the second round hole 17a. It will be appreciated that, depending on the specific embodiment, the second circumferential limit notch 19b may not be provided, or a greater number of the second circumferential limit notches 19b may also be provided. The bonding and working principle of the second circumferential limit notch 19b is similar to the first circumferential limit notch 19a.

It will be appreciated that in optional embodiments, the first through hole 16 and the second through hole 17 are not limited to the specific shape as shown in the figure. For example, the axial connection function can be achieved as long as the first through hole 16 and the second through hole 17 are non-circular in shape.

Figure 5:
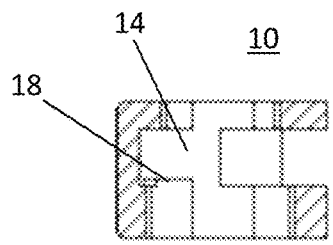
FIG. 5 is a cross-sectional view taken along line A-A in FIG. 2.
Figure 6:
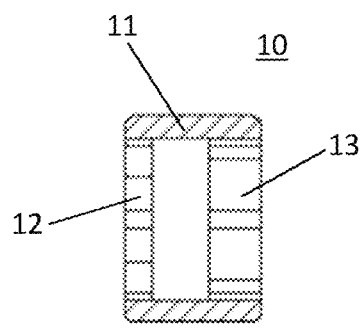
FIG. 6 is a cross-sectional view taken along line B-B in FIG. 3.
Figure 7:
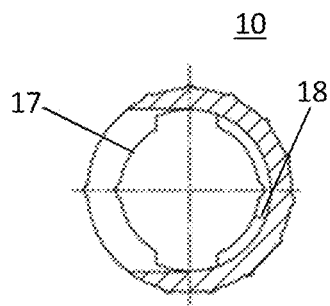
FIG. 7 is a cross-sectional view taken along line C-C in FIG. 4.

FIG. 5 is a cross-sectional view taken along line A-A in FIG. 2. FIG. 6 is a cross-sectional view taken along line B-B in FIG. 3. FIG. 7 is a cross-sectional view taken along line C-C in FIG. 4.

As can be seen in conjunction with these cross-sectional views, in this embodiment, the first end wall 12 may be provided with a first protrusion 18 at a distance from the first guide slot 16b circumferentially on one side within the interior cavity 14.

Similarly, it may be understood that in optional embodiments, the second end wall 13 may also be provided with a second protrusion (not illustrated) at a distance from the second guide slot 17b circumferentially on one side within the interior cavity 14.

As may also be seen from FIGS. 5 and 6, in this embodiment, the thicknesses of the first end wall 12 and the second end wall 13 are not the same. As may be understood, in optional embodiments, the respective thicknesses of the first end wall 12, the second end wall 13, and the circumferential side wall 11 may be designed according to specific needs, for example taking into consideration various circumstances such as, but not limited to, connection strength, manufacturing material, installation space, and the like.

One aspect of the invention also provides a connecting assembly comprising the connector of any of the foregoing embodiments. The connecting assembly may further include a first connecting joint on the first component to be connected (not illustrated) that conforms to the shape of the first through hole and a second connecting joint on the second component to be connected (not illustrated) that conforms to the shape of the second through hole. The shapes of the first and second through holes are adapted to be non-circular in shape such that the first connecting joint may be adapted to enter the interior cavity through the first through hole, the second connecting joint may be adapted to enter the interior cavity through the second through hole, and they engage the first end wall and the second end wall, respectively, within the interior cavity after the connector is rotated by an angle, thereby enabling a reliable axial connection between the first component to be connected and the second component to be connected.

Figure 8:
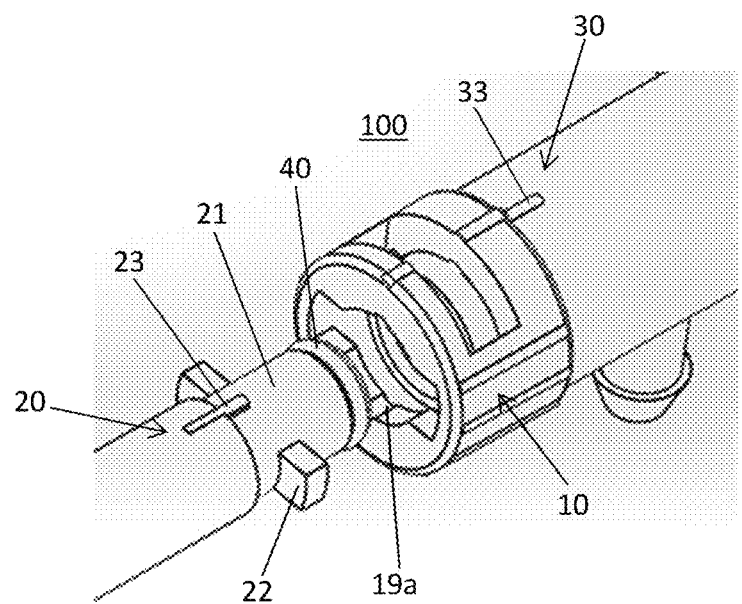
FIG. 8 is a schematic view of a connecting assembly according to one embodiment of the present invention, with the connecting assembly is in a disassembled state.
Figure 9:
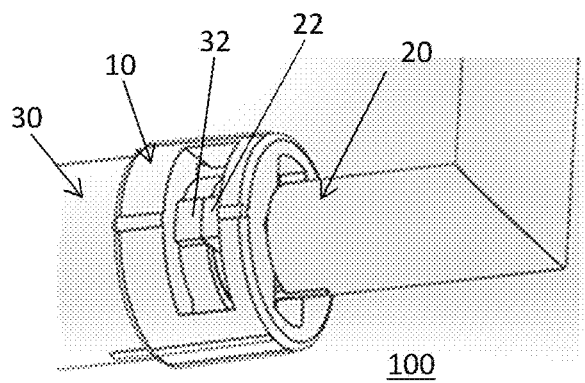
FIG. 9 is a schematic view of the connecting assembly in FIG. 8 with the connecting assembly in a connected state.
Figure 10:
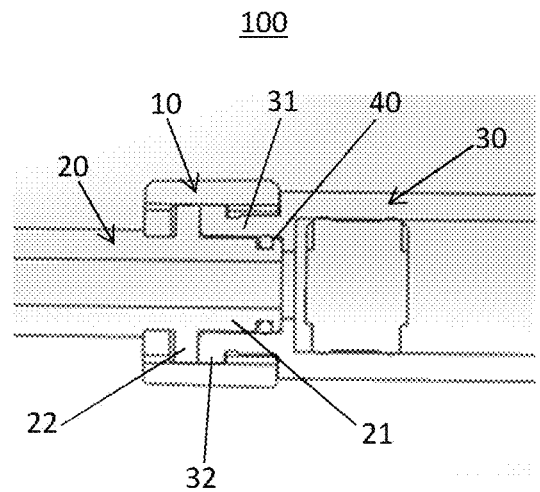
FIG. 10 is a cross-sectional view of the connecting assembly in FIG. 9 in a connected state.

The structures, principles, and advantages of the connecting assembly of this aspect will be more readily understood in conjunction with the examples of the connecting assembly in FIGS. 8-10.

FIG. 8 is a schematic view of a connecting assembly according to one embodiment of the present invention, with the connecting assembly is in a disassembled state. FIG. 9 is a schematic view of the connecting assembly of FIG. 8 with the connecting assembly in a connected state. FIG. 10 is a cross-sectional view of the connecting assembly in FIG. 9 in a connected state.

As illustrated in the figures, the connecting assembly 100 may include the connector 10 as in any of the foregoing embodiments. In addition, the connecting assembly 100 further includes a first connecting joint 20 on the first component to be connected (not illustrated) that conforms to the shape of the first through hole 16 of the connector 10 and a second connecting joint 30 on the second component to be connected (not illustrated) that conforms to the shape of the second through hole 17.

Figure 12:
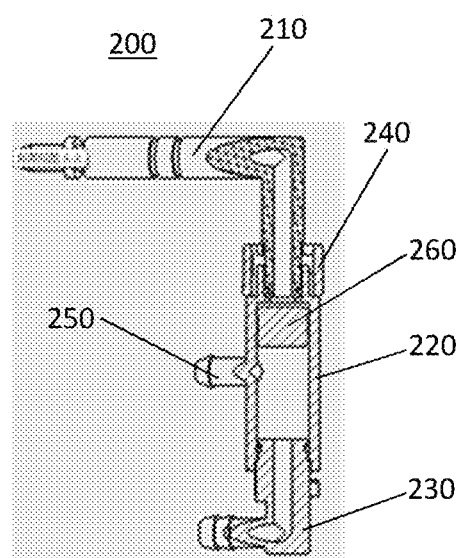
FIG. 12 is a schematic view of a dispensing mechanism of a tire repairing machine according to one embodiment of the present invention.

More specifically, illustrated in FIGS. 8-10 is a connecting assembly in a tire repairing machine, wherein the first component to be connected is a tire repairing liquid connecting tube 210 in a tire repairing machine (see FIG. 12), and the second component to be connected is a valve body 220 in a tire repairing machine (see FIG. 12).

As can be seen from the figures, in this embodiment, the first connecting joint 20 may include a first cylindrical portion 21 having a first open end and a first lug 22 provided on the first cylindrical portion; the second connecting joint 30 may have a second cylindrical portion 31 including a second open end and a second lug 32 provided on the second cylindrical portion; a first circumferential limiting protrusion 23 may be formed on the outer periphery of the first cylindrical portion 21; a second circumferential limiting protrusion 33 may be formed on the outer periphery of the second cylindrical portion 31.

As can be understood in connection with FIGS. 8-10, the shapes of first cylindrical portion 21 and the first lug 22 of the first connecting joint 20 conform to that of the first round hole 16a and the first guide slot 16b of the connector 10, respectively. When a connection is desired, the first cylindrical portion 21 and the first lug 22 may be made through the first round hole 16a and the first guide slot 16b, after which the first lug 22 may be engaged within the interior cavity on the inside surface of the first end wall 12 after rotating the connector 10 by an angle, to realize an axial connection between the first connecting joint 20 and the connector 10. In the illustrated example, the connector 10 is rotated 90 degrees to enable a reliable connection.

Similarly, the shapes of the second cylindrical portion 31 and the second lug 32 of the second connecting joint 30 conform to that of the second round hole 17a and the second guide slot 17b of the connector 10, respectively. When a connection is desired, the second cylindrical portion 31 and the second lug 32 may be made through the second round hole 17a and the second guide slot 17b, after which the second lug 32 may be engaged within the interior cavity on the inside surface of the second end wall 13 after rotating the connector 10 by an angle, to realize the connection between the second connecting joint 30 and the connector 10.

It will be appreciated that in actual operation, the first connecting joint 20 and the second connecting joint 30 may firstly reach into the connector 10, and then the connector 10 is rotated by an angle to achieve the connection.

The first protrusion 18 inside the first end wall 12 is described above in connection with FIGS. 5 and 7, and a second protrusion inside the second end wall 13 is mentioned. When the first and second lugs 22, 32 are engaged in the connector 10, the first and second protrusions may define a circumferential engagement position of the connector relative to the first and second connecting joint by engaging the first and second lugs, respectively, enabling them to be effectively engaged with the first and second end walls of the connector 10. Specifically, the first and second lugs will block the first and second protrusions when the connector is rotated to an appropriate circumferential position, thereby limiting further relative rotation of the connector relative to the first connecting joint and/or the second connecting joint, retaining it in the optimal connection position. It may be understood that regardless of the number of first and second lugs, only one first protrusion and/or only one second protrusion may be provided, and a good positioning effect can also be achieved.

As shown in FIG. 10, since the first component to be connected in this embodiment is a tire repairing liquid connecting tube in a tire repairing machine and the second component to be connected is a valve body in a tire repairing machine, the first connecting joint 20 may have a first open end and the second connecting joint 30 may have a second open end. Specifically, in this embodiment, the first open end is located at the end of the first cylindrical portion 21 and the second open end is located at the end of the second cylindrical portion 31. Thus, in the state where the first connecting joint 20 and the second connecting joint 30 are engaged with the connector 10, the first open end of the first connector may sealingly reach into the second open end of the second connecting joint such that the first open end and the second open end may be connected to form a fluid pathway.

Figure 11:
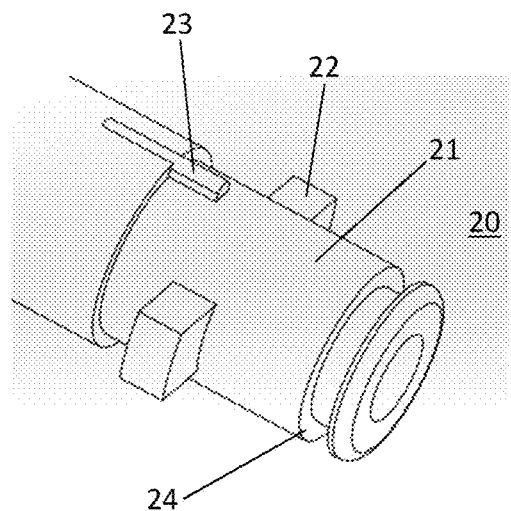
FIG. 11 is a schematic view of one connecting joint of the connecting assembly in FIG. 8.

FIG. 11 is a schematic view of one connecting joint in the connecting assembly of FIG. 8. As can be seen from FIG. 11, a ring of groove 24 may be provided on the outer circumference of the first cylindrical portion of the first connecting joint 20 near the distal end, and may be used to embed a seal ring 40 therein (see FIG. 10) to enable fluid sealing with the inner circumference of the second connecting joint 30, preventing media from leaking and ensuring reliable operation of the connection portion.

In FIGS. 8 and 11, a first circumferential limiting protrusion 23 and a second circumferential limiting protrusion 33 are provided on the outer peripheral sides of the first connecting joint 20 and the second connecting joint 30, respectively. When the first connecting joint 20 is connected to the connector 10, the first connecting joint 20 firstly reaches into the first through hole 16 of the connector 10, and then the connector 10 is rotated in a set direction, and when engaged in place, the first circumferential limiting protrusion 23 may be snapped slightly into the first circumferential limit notch 19a in the first round hole 16a of the first end wall 12, producing a in-place feeling as an indication of alignment. It will be appreciated that a similar design applies equally to the second circumferential limiting protrusion of the second connecting joint 33 and the second circumferential limit notch 19b in the first round hole 17a of the second end wall 12. The number of the first circumferential limiting protrusion and the second circumferential limiting protrusion is adapted to be correspondent with the number and the circumferential distribution positions of first circumferential limit notches and the second circumferential limit notches, respectively.

It is to be noted here that, when the first through hole of the first end wall and/or the second through hole of the second end wall are of other non-circular shapes, such as oval, polygonal, irregular shapes and the like, the first connecting joint and the second connecting joint may also employ corresponding shapes to allow the first connecting joint and the second connecting joint to pass through the first through hole and the second through hole, and to form a reliable axial connection by engaging the joints with the insides of the first end wall and the second end wall after the connector is rotated by a certain angle.

It will be appreciated that in optional embodiments, when the connecting assembly is not used in a tire repairing machine, it may also be provided with respective features such as a first open end, a second open end, and the like, to be adapted to reliably deliver fluid.

Another aspect of the invention provides a tire repairing machine. The tire repairing machine may be provided with the connecting assembly as described in any of the foregoing embodiments.

For example, in an optional embodiment, the tire repairing machine may have a valve body, a tire repairing liquid connecting tube, and an air compressor connecting tube, the tire repairing liquid connecting tube and an air compressor connecting tube may be connected to the dispensing nozzle of the tire repairing machine through the valve body, respectively, and the tire repairing liquid connecting tube and the valve body may be connected by a connecting assembly therebetween. At this time, the tire repairing liquid connecting tube and the valve body may serve as a first component to be connected and a second component to be connected respectively. It can be seen that, such arrangement is for a dual purpose tire repairing machine that, through its dispensing nozzle, it can both dispense the tire repairing liquid to repair a tire and can also dispense air to inflate the tire.

FIG. 12 shows a schematic view of the dispensing mechanism of the tire repairing machine of this embodiment.

According to the example in the figure, in the dispensing mechanism 200, one end of the tire repairing liquid connecting tube 210 and one end of the air compressor connecting tube 230 are connected to the valve body 220, respectively. The other end of the tire repairing liquid connecting tube 210 may be connected to a tire repairing liquid vessel (not illustrated), and the other end of the air compressor connecting tube 230 may be connected to an air compressor (not illustrated). The valve body 220 may be provided therein with a plug 260 that is capable of sliding back and forth within the valve body 220, thereby enabling the switch of the valve body communication between the tire repairing liquid vessel and the air compressor. When the pressure at the air compressor connecting tube 230 is greater than the pressure at the tire repairing liquid connecting tube 210, the plug 260 moves to the tire repairing liquid connecting tube 210, and the dispensing nozzle 250 is adapted to inflate the tire; when the pressure at the air compressor connecting tube 230 is smaller than the pressure at the tire repairing liquid connecting tube 210, the plug 260 moves to the air compressor connecting tube 230, and the dispensing nozzle 250 is adapted to dispense the tire repairing liquid to perform the tire repairing operation.

In FIG. 12, the connection between the tire repairing liquid connecting tube 210 and the valve body 220 advantageously employs the connecting assembly of the aforementioned embodiments of the present invention, with the connector 240 connected between the tire repairing liquid connecting tube 210 and the valve body 220. For this simple structural design for the sealing assembly and disassembly of the tire repairing liquid connecting tube and the valve body, convenience is provided for assembly and disassembly in a small space of products such as the tire repairing machine.

It will be appreciated that while the present specification describes the application of connectors and connecting assemblies in connection with the example of a tire repairing machine, the connectors and connecting assemblies required with respect to the present application are not limited to being used in a tire repairing machine, but are applicable to any device requiring axial connection.

The technical scope of the invention is not limited to merely the content in the above specification, and those skilled in the art may perform various variations and modifications to the above-described embodiments without departing from the technical idea of the invention, and all the variations and modifications should be within the scope of the invention.

What is claimed is:

1. A connector, comprising:
   a circumferential side wall defining an interior cavity of the connector;
   a first end wall in which a first through hole is provided, the first through hole communicating the interior cavity with an exterior of the connector;
   a second end wall in which a second through hole is provided, the second through hole communicating the interior cavity with the exterior of the connector, wherein,
   the first through hole and the second through hole are both of a non-circular shape;
   the first through hole comprises a first round hole and at least one first guide slot on a periphery of the first round hole, and/or the second through hole comprises a second round hole and at least one second guide slot on a periphery of the second round hole, and
   a first protrusion is provided at a distance from the at least one first guide slot circumferentially on one side within the interior cavity of the first end wall, and/or a second protrusion is provided at a distance from the at least one second guide slot circumferentially on one side within the interior cavity of the second end wall.

2. The connector of claim 1, wherein the first through hole comprises the first round hole and the at least one first guide slot on a periphery of the first round hole and wherein the at least one first guide slot comprises a plurality of first guide slots evenly distributed along the circumference of the first round hole, and/or and the second through hole comprises the second round hole and the at least one second guide slot on the periphery of the second round hole and wherein the at least one second guide slot comprises a plurality of second guide slots evenly distributed along the circumference of the second round hole.

3. The connector of claim 1, wherein the first end wall has a first circumferential limit notch formed at the circumference of the first round hole, and/or the second end wall has a second circumferential limit notch formed at the circumference of the second round hole.

4. The connector of claim 1, wherein a damping portion is formed on an outer periphery of the connector.

5. A connecting assembly, comprising: the connector according to claim 1 and a first connecting joint on a first component to be connected that conforms to the shape of the first through hole and a second connecting joint on the second component to be connected that conforms to the shape of the second through hole, the first connecting joint is adapted to enter the interior cavity through the first through hole, the second connecting joint is adapted to enter the interior cavity through the second through hole, and after the connector is rotated by a certain angle, within the interior cavity, the first connecting joint is engaged with the first end wall and the second connecting joint is engaged with the second end wall.

6. The connecting assembly of claim 5, wherein in the engaged state, a first open end of the first connecting joint sealingly reaches into a second open end of the second connecting joint.

7. The connecting assembly of claim 6, wherein the first connecting joint includes a first cylindrical portion having the first open end and a first lug provided on the first cylindrical portion, and/or the second connecting joint has a second cylindrical portion including the second open end and a second lug provided on the second cylindrical portion.

8. The connecting assembly according to claim 7, wherein a first circumferential limiting protrusion is formed on the outer periphery of the first cylindrical portion and/or a second circumferential limiting protrusion is formed on the outer periphery of the second cylindrical portion.

9. A tire repairing machine provided therein with the connecting assembly according to claim 5.

10. The tire repairing machine of claim 9, wherein the tire repairing machine has a valve body, a tire repairing liquid connecting tube, and an air compressor connecting tube, the tire repairing liquid connecting tube and the air compressor connecting tube are connected to a dispensing nozzle of the tire repairing machine through the valve body, respectively, and
   a plug capable of sliding back and forth is provided in the valve body;
   the tire repairing liquid connecting tube and the valve body are connected through the connecting assembly therebetween, and the tire repairing liquid connecting tube and the valve body serve as the first component to be connected and the second component to be connected, respectively.

* * * * *